United States Patent [19]

Barri

[11] Patent Number: 4,916,690
[45] Date of Patent: Apr. 10, 1990

[54] DIVISION MULTIPLEX PACKET SWITCHING CIRCUIT USING A CIRCULAR SHIFT REGISTER

[75] Inventor: Peter I. A. Barri, Bonheiden, Belgium

[73] Assignee: Alcatel N.V., Amsterdam, Netherlands

[21] Appl. No.: 190,929

[22] Filed: May 6, 1988

[30] Foreign Application Priority Data

May 7, 1987 [BE] Belgium .............. 08700493

[51] Int. Cl.[4] .............................................. H04J 3/26
[52] U.S. Cl. .................................. 370/60; 370/85.15; 370/94.2
[58] Field of Search ............ 370/60, 94, 86, 58, 370/100

[56] References Cited

U.S. PATENT DOCUMENTS

| | | | |
|---|---|---|---|
| 4,393,497 | 7/1983 | Cantwell, Jr. .................. | 370/89 |
| 4,528,661 | 7/1985 | Bahr et al. .................... | 370/86 |
| 4,665,517 | 5/1987 | Widmer ........................ | 370/86 |
| 4,760,570 | 7/1988 | Acampora et al. ............. | 370/60 |
| 4,761,780 | 8/1988 | Bingham ...................... | 370/86 |
| 4,768,190 | 8/1988 | Giancarlo ..................... | 370/86 |

FOREIGN PATENT DOCUMENTS 904100 1/1986 Belgium .
3543392 6/1987 Fed. Rep. of Germany .

Primary Examiner—Douglas W. Olms
Assistant Examiner—Min Jung
Attorney, Agent, or Firm—Christie, Parker & Hale

[57] ABSTRACT

A switching network including one or more switching circuits and a control circuit (CCC), the switching circuit including a time division switching element (SR12–SR78) provided with inputs and outputs for data packets and the switching element being controlled by the control circuit (CCC). This switching element is constituted by a closed loop shift register (SR12–SR78) of which all the stages are controlled by a clock signal (f2) provided by the control circuit (CCC) and form a number of shift register portions (SR12–SR78) which are each (SR12) associated to a parallel input (h12) having access to all stages of this portion. A plurality of inputs (R$\frac{i}{2}$) of the switching element have access to this parallel input (h12) via a multiplexer (MUX12).

8 Claims, 3 Drawing Sheets

DIVISION MULTIPLEX PACKET SWITCHING CIRCUIT USING A CIRCULAR SHIFT REGISTER

TECHNICAL FIELD

The present invention relates to a switching network including a time division switching element provided with inputs and outputs for data packets, said switching element being controlled by a control circuit.

CLAIM FOR PRIORITY

This application is based on and claims priority from an application first filed in Belgium on May 7, 1987 under serial number 08700493. To the extent such prior application may contain any addition information that might be of any assistance in the use and understanding of the invention claimed herein, it is hereby incorporated by reference.

BACKGROUND ART

Such a switching network is already known from Belgian patent no. 904100 (P. DEBUYSSCHER et al 3-5-1). Therein the switching element is an electrical bus and the control circuit periodically assigns a time slot to each input thereof which is used to transfer data to an output. Since with such a bus the path between an input and an output is not the same for all inputs and outputs, bit shifts may occur at high data bit rates, e.g. of the order of 500 Megabit/sec., so that the data then appearing at the outputs are no longer synchronized. Obviously this is undesirable and post transmission means are required to recover the synchronism.

Another drawback of such a bus is that the data transmission thereon occurs in two directions and that during this transmission the data have to pass the junction points of various inputs and outputs on the bus. In order to prevent electric reflections at the above mentioned high bit rates it is therefore necessary to correctly terminate this bus at both its ends and at each location of the inputs and outputs. However, such terminations can generally not be made ideal and therefore give rise to distortion of the data.

DISCLOSURE OF INVENTION

An object of the invention is to provide an improved switching network of the above type, but which does not present the above mentioned drawbacks.

According to the invention this object is achieved by means of a switching element in the form of a circular shift register controlled by a clock signal provided by the control circuit. Different portions of the circular shift register are each associated with a separate parallel input having access to a plurality of shift register stages.

Since all stages of the shift register are controlled by the same clock no undesirable bit shifts may occur in the data passing through this register. Moreover, in such a shift register there will be no electric reflections and since the data is input in parallel a data packet may be loaded quickly and the full storage capacity of the shift register utilized.

The above mentioned and other objects and features of the invention will become more apparent and the invention itself will be best understood by referring to the following description of an embodiment taken in conjunction with the accompanying drawings wherein:

BEST MODE FOR CARRYING OUT THE INVENTION

Figure 1:
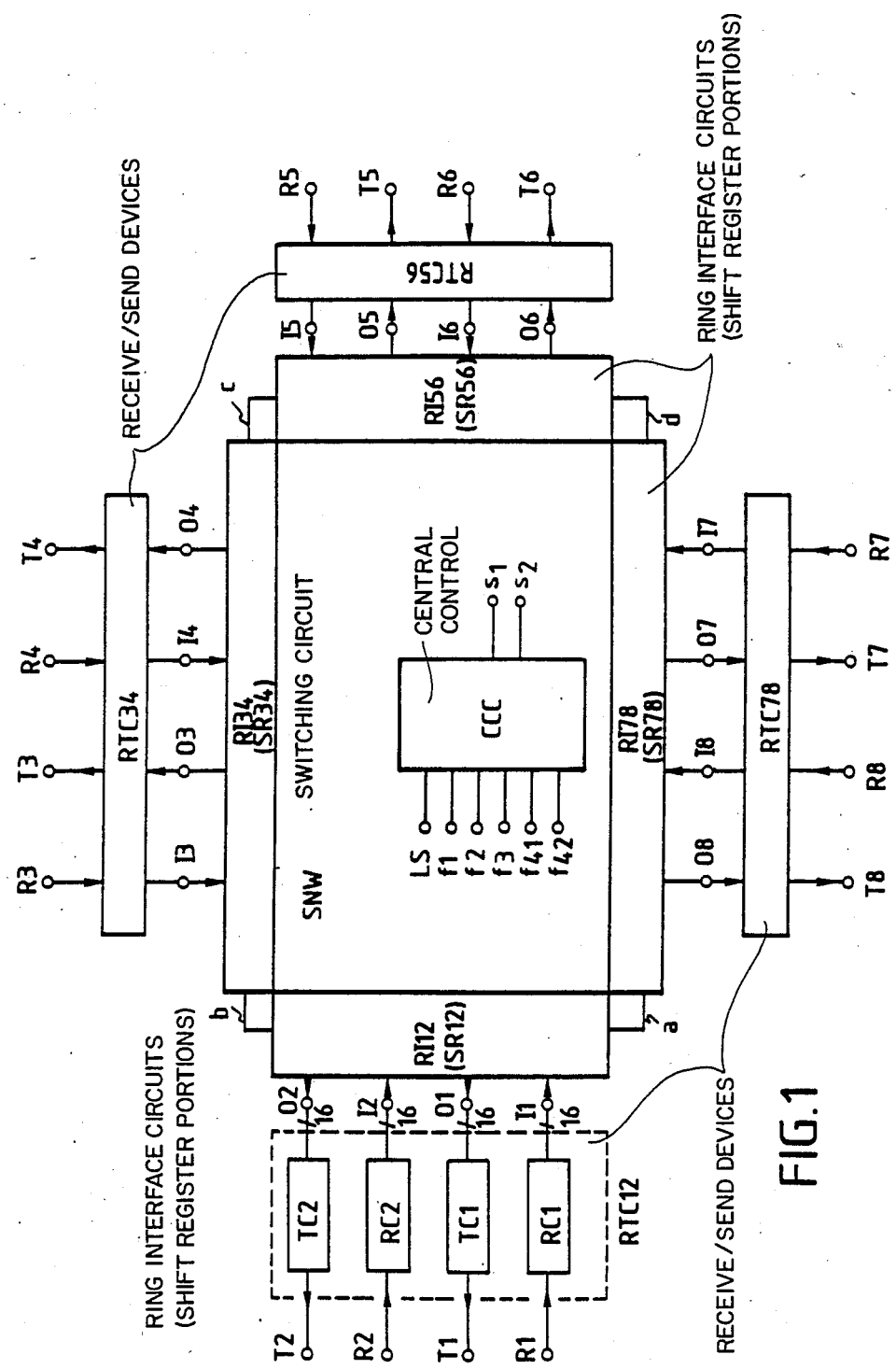
FIG. 1 is a switching device of a switching network according to the invention.

A switching network may for instance be constituted by a plurality of interconnected switching devices of the type represented in FIG. 1. This switching device has input terminals R1/8 and output terminals T1/8 and is constituted by a switching circuit SNW and associated send and receive devices. The switching circuit SNW is constituted by four ring interface circuits RI12, RI34, RI56 and RI78 to each of which an associated receive and send device is connected, RTC12, RTC34, RTC56 and RTC78 respectively. These ring interface circuits and receive and send devices are controlled by means of signals f1, f2, f3, f41, f42, s1, s2 and LS provided by a central control circuit CCC, as will be explained later with reference to the other figures. It should be noted that when the switching network includes a plurality of switching devices, the control circuit CCC is common to all.

The ring interface circuits RI12, RI34, RI56 and RI78 together include a circular shift register, of which the portions forming part of these ring interface circuits are indicated by SR12, SR34, SR56 and SR78 respectively. These portions are only represented separately in the interest of clarity the 16-wire connections a, b, c, d, interconnecting the respective last and first 16-bit stages of adjacent portions are no different electrically than the (not shown) connections between the other 16-bit stages of the shift register. Each of the ring interface circuits RI12, RI34, RI56 and RI78 is provided with a pair of inputs and outputs each comprising 16 wires, I1/O1, I2/O2; I3/O3, I4/O4; I5/O5, I6/O6; I7/O7, I8/O8 respectively. The input and output terminals R1/2, T1/2; R3/4, T3/4; R5/6, T5/6 and R7/8, T7/8 of the switching devices are respectively coupled to receive and send circuits forming part of the associated receive and send device. For instance, the input terminal R1 is coupled through receive circuit RC1 to input I1 of RI12 whose output O1 is connected to output terminal T1 via send circuit TC1. In a similar way input terminal R2 is coupled with input I2 of ring interface circuit RI12 via receive circuit RC2 and the output O2 of RI12 is connected to output terminal T2 via send circuit TC2 forming part together with RC2, RC1 and TC1 of the receive and send circuit RTC12. The other ring interface circuits are coupled to input and output terminals in a similar way.

Figure 2:
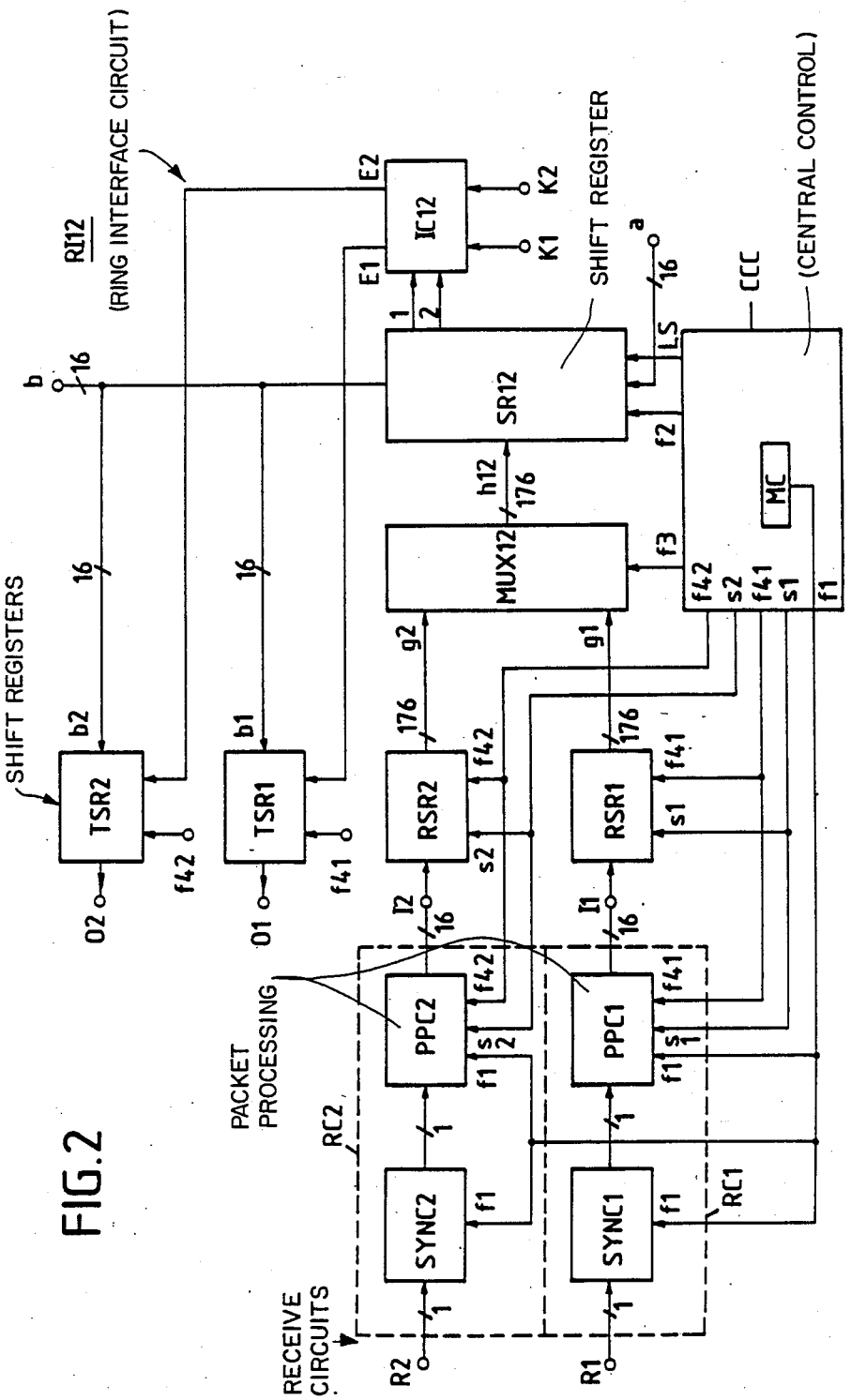
FIG. 2 shows part of FIG. 1 in more detail.
Figure 3:
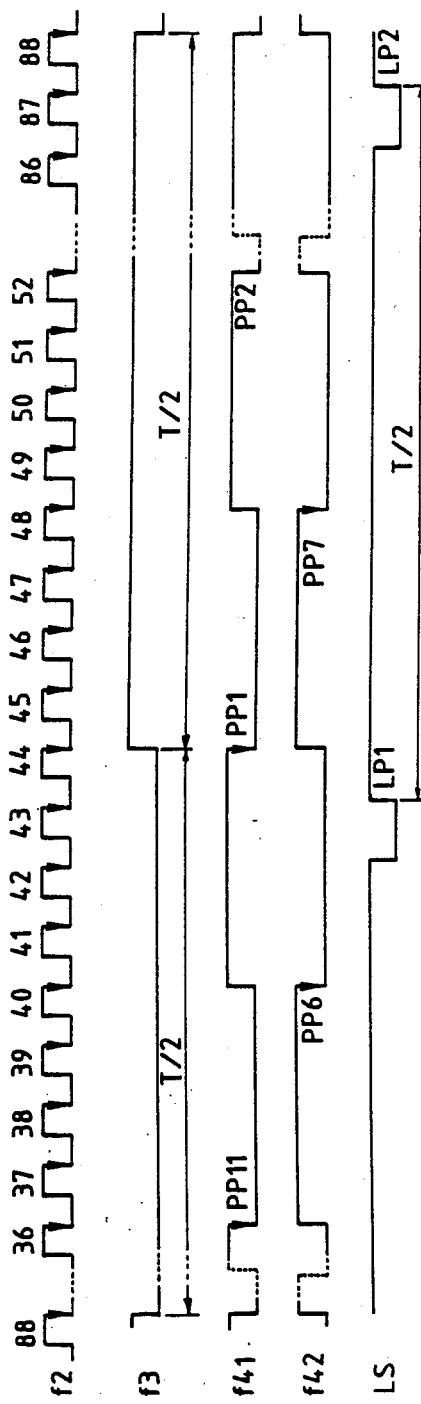
FIGS. 3 and 4 represent pulse wave forms generated by the central control circuit CCC of FIG. 1.
Figure 4:
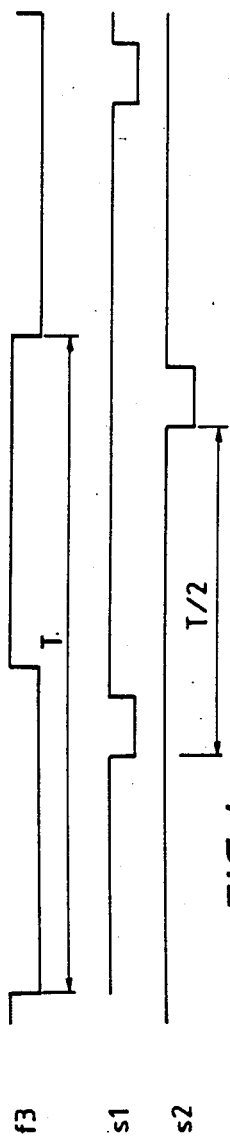

Reference is now made to FIGS. 2 to 4 wherein FIG. 2 represents ring interface circuit RI12, receive circuits RC1 and RC2 and central control circuit CCC of FIG. 1 in more detail.

This central control circuit CCC has a main clock MC generating a main clock signal f1 of frequency f1. From this clock signal f1, CCC derives the following signals:

a clock signal f2 of frequency f2=(f1/2) represented in FIG. 3;
a clock signal f3 of frequency f3=(f2/88). In FIG. 3 is shown a period T of f3 together with some of the 88 pulses of f2 occuring during such a period;

mutually inverse clock signals f41 and f42, both of frequency f4=(f1/16)=(f2/8)=11f3.

In FIG. 3 are shown some of the 11 pulses PP1 to PP11 of f41 and f42 which occur during a period T of f3;

the load signal LS including negatively directed load pulses such as LP1 and LP2 which have a duration equal to a period of the clock signal f2 and are slightly shifted with respect to the 43rd and 87th period of this signal respectively.

FIG. 4 shows the mutually inverse clock signals f41 and f42 and also the clock signal f3 on a more condensed scale than in that used FIG. 3. Also shown therein are data packet synchronizing signals s1 and s2 which are also generated by the circuit CCC and which each have a negatively directed pulse with a duration equal to a period of f41 and f42. These negatively directed pulses are mutually shifted over a time interval T/2. The pulses PP1 to PP11 of f41 and f42 occurring during a period T are numbered from the end of the negatively directed pulse of the corresponding data packet synchronization signal s1 and s2.

The receive circuit RC1 shown in FIG. 2 includes, between its input terminal R1 and the input I1 the ring interface circuit RI12, of a synchronizing circuit SYNC1 and a data packet processing circuit PPC1 which are coupled by a 1-wire serial connection. In a similar way the receive circuit RC2 includes, between its input terminal R2 and the input I2 of the ring interface circuit RI12, a synchronizing circuit SYNC2 and a data packet processing circuit PPC2 which are coupled by a 1-wire serial connection. The circuits SYNC1 and SYNC2 are for instance of the type described in published German patent application No. P3543392.2 (M. KLEIN et al 3-3-1) and are used to maintain the phase synchronization of the data entering on their respective input terminal R1, R2 and which have been transmitted by a remote user station at the frequency f1. The data packet processing circuits PPC1 and PPC2 have 16-wire outputs I1 and I2 which are connected to like named inputs of the ring interface circuit RI12.

The ring interface circuit RI12 includes receive shift registers RSR1 and RSR2 having respective inputs I1 and I2 and send shift registers TSR1 and TSR2 having outputs O1 and O2. Each of the receive shift registers RSR1 and RSR2 has a 176-wire output, g1 and g2 respectively, and these outputs are coupled with like named inputs of a multiplexer unit MUX12 whose 176-wire output h12 is connected to the like named parallel input of the shift register portion SR12. This shift register portion SR1 has the above mentioned 16-wire serial input a and the 16-wire serial output b which is also connected to inputs b1 and b2 of TSR1 and TSR2.

The outputs 1 and 2 of the first two bit cells of the first stage of SR12 are connected to the inputs of an identification circuit IC12 to which are also connected the identification terminals K1 and K2. Terminals K1 and K2 are associated respectively with to the outputs O1 and O2 and are used to select these outputs. By comparing the information present on the outputs 1 and 2 with the information at terminals K1 and K2, it may be determined whether the packet loaded in the shift register portion SR12 (which is about to be transmitted to the next ring interface circuit RI34) should be output to TSR1 or/and TSR2.

In the other ring interface circuits RI34, RI56 and RI78 the corresponding output bits 3, 4; 5, 6 and 7, 8 of the other shift register portions are each also connected to an associated identification circuit.

By means of master clock signal f1 and of the derivative signals f2, f3, f41, f42, s1, s2 and LS above described and represented in FIGS. 3 and 4 with their active edges indicated with arrows the control circuit CCC controls the various circuits as follows:

SYNC1 and SYNC2 are controlled by f1;
PPC1 and PPC2 are controlled by f1, s2, f41 and f1, s2, f42 respectively;
RSR1, TSR1 and RSR2, TSR2 are controlled by f41, s1 and f42, s2 respectively;
MUX12 is controlled by f3;
SR12 is controlled by f2 and LS.

In connection with clock signal f3 which controls the multiplexer unit MUX12 and which functions as a selection signal, it should be noted that RSR1 and RSR2 are coupled to SR12 via MUX12 during the negatively and positively directed half period T/2 of f3 respectively. This means that a transfer of data from RSR1 or RSR2 to SR12 via MUX12 may only take place during one such half period T/2.

The operation of the above described switching device of the switehing network is as follows.

It is assumed that data in the form of fixed length packets of for instance 176 bits and at a bit rate of e.g. f1=684 Megabit/sec. are supplied serially to the terminals R1 and R2 of the respective receive circuits RC1 and RC2. The first N=8 bits of the heading of these packets are for instance reserved for identifying the packets output destination as will be explained later. Because these packets are processed in the same way in receive circuits RC1 and RC2, only RC1 is considered. It is also assumed that before the transmission of any data packets a path has been determined from R1 through the switching circuit SNW by means of a control packet and that the identity of the particular output O1/8 of SNW which forms part of this path has been stored in the packet processing circuit PPC1. This identity data is constituted by N=8 bits which are associated with a corresponding one of the outputs O1/8 and which are 1 or 0 depending on the packet having to be supplied or not to the corresponding output. A plurality of the N-bits may thus be simultaneously set to 1, meaning that the same packet may be supplied to various outputs (broadcasting).

The bits of each of the data packets which are serially supplied to RC1 are synchronized in phase in the synchronizing circuit SYNC1 and are then supplied to the data packet processing circuit PPC1 which performs the following operations:

in the heading of each packet the reserved first N=8 bits are replaced by the identity of the output O1/8 of the switching circuit SNW to which the packet has to be supplied;

the serial input data are converted in a conventional and therefore not shown converter into parallel data under the control of a clock signal f4 having the frequency f4=(f1/I6) which is derived by division from clock signal f1. Each data packet may thus be converted into 11 subpackets of 16 parallel bits and be stored in a conventional so called elastic buffer circuit (not shown) having a storage capacity of a single data packet;

as soon as data is available in this buffer circuit and when simultaneously the packet synchronizing signal s1 is active the clock signal f41 is made active, so that the data is then shifted towards the output I1 of PPC1 at the frequency f4 of this clock signal f41 by the active edges thereof.

The data of each packet appearing at the output of PPC1 are entered in the shift register RSR1 under the control of the active edges of the clock pulses of clock signal f41. More particularly, the 11 consecutive subpackets of a signal data packet are entered in RSR1 under the control of the active edges of the clock pulses PP1 to PP11 which—as already mentioned earlier—are numbered from the end of the data packet synchronizing signal s1. In a similar way the 11 consecutive data packets of a signal data packet are entered from PPC2 in RSR2 under the control of the active edges of the clock pulses PP1 to PP11 which are numbered from the end of the data packet synchronization signal s2. Since like named pulses are mutually shifted with a period T/2 the transfer of like name subpackets occurs with a time shift equal to T/2. This means that after the active edge of PP11 of f41 a single complete data packet is present in RSR1 and also that after the active edge of PP11 of f42 a single complete packet is stored in RSR2.

From FIG. 3 it appears that the active edge of PP11 of f41 coincides with the active edge of the 36th pulse of f2, one period T of which contains 88 such pulses. Because the active edge of the 43rd pulse of f2 falls within the load pulse LP1 of the load signal LS the whole packet is loaded by this active edge from RSR1 into the shift register portion SR12. This happens before the occurrence of the active edge of PP1 of f41, i.e. before the first subpacket of a new packet is loaded in RSR1.

By means of the active edges of the pulses 44, 45, .. . etc. of clock signal f2 the packet present in SR12 appears on the 16-wire output b of SR12 in subpackets of 16 bits. Since each packet contains 11 subpackets of 16 bits the packet frequency on the ring is equal to f2/11 or 8f3.

Before performing this shift operation and also each time a complete data packet is present in the shift register portion SR12, identification circuit IC12 checks whether or not the packet destination is O1 or/and O2. This is done by means of the N=8 first bits of this packet which are stored in the first N bit cells of the shift register and with the help of the identity inputs K1 and K2 of corresponding to outputs O1 and O2. In the identification circuit IC12 this happens more particularly by means of the first two bits of N, since these are associated with the outputs O1 and O2 respectively:

when K1 and the first bit of N are equal, TSR1 is enabled by the signal E1 so that the clock signal f4 may read-in this packet;

when K2 and the second bit of N are equal, TSR2 is enabled to do so and the packet is read-in by f42;

when K1 and the first bit of N as well as K2 and the second bit of N are equal the data packet is read-in into TSR1 as well as in TSR2.

A packet which is stored in RSR2 is loaded in the shift register portion SR12, in a similar way and by means of a load pulse LP2 and via MUX12, half a period T/2 after this has happened for RSP1. This means that the ring interface circuit RI12 is adapted to load two packets onto the ring during each period T, so that the packet input frequency is equal to 2f3. The other three ring interface circuits are controlled by the same clocks in the same way as RI12. This means that the four ring interface circuits are able to periodically load packets onto the ring synchronously with a frequency 2f3. Since the frequency at which these packets are shifted on the ring is equal to 4×2f3 each of these packets can pass through the ring before arriving again in the shift register portion of origin, i.e. before a new packet is read-in. The data of this new packet thereby overwrite the previous data.

Such as described above, the bits of a data packet are simultaneously loaded in parallel into all stages of the shift register portion SR12. Because such an implementation of the load function makes each shift register stage relatively complex when compared with a stage having only the shift function, it may be desirable to reduce the number of stages having both load and shift functions. This may for instance be done by equipping only the stages of SR12 located close to the input a with such a double function and by starting the loading operation as soon as a part of the packet which has passed through the whole ring is present in this portion.

While the principles of the invention have been described above in connection with specific apparatus, it is to be clearly understood that this description is made only by way of example and not as a limitation on the scope of the invention.

I claim:

1. A switching network comprising
   a control circuit for providing a clock signal and
   at least one time division switching element having input ports and output ports for transporting individual data packets from a designated input port to a designated output port, each said switching element comprising
   a plurality of shift register portions each having a predetermined number of stages,
   a corresponding plurality of associated input circuits, each such input circuit having a parallel output port for loading in parallel a plurality of bits in more than one stage of its corresponding said shift register portion, and
   means for coupling successive ones of said shift register portions of said switching element in series to form a circular shift register which shifts data from each stage of the circular shift register to a next stage immediately adjacent said each stage in response to and in synchronism with said clock signal.

2. Switching network according to claim 1, wherein each said input circuit loads in parallel all stages of its said corresponding shift register portion.

3. A switching network according to claim 1, wherein each said input circuit further comprises
   input loading means for periodically loading fixed length data packets from an input port of said input loading means into its corresponding said shift register portion in synchronism with said clock signal, the period between successive such loadings being equal to the time required for a single such fixed length data packet to be completely shifted through all the stages of the entire said circular shift register.

4. A switching network according to claim 3, wherein each said input loading means further comprises
   a first data packet storage circuit having at least two output ports, an input port of said first storage circuit constituting an input port of said input circuit, and
   a multiplexer unit for selectively coupling one of said at least two output ports of said first storage circuit to a parallel input port of its corresponding said shift register portion.

5. A switching network according to claim 4, wherein
   each said switching element further comprises a corresponding plurality of second data packet storage circuits each having at least one input port coupled to a serial output port of its corresponding said shift register portion and at least one output port which constitutes one of the output ports of the switching element,
   each said second data packet storage circuit forms part of a corresponding switching device having a plurality of input ports, output ports and receiver circuits, each said receiver circuit comprising data bit synchronizing means to perform data packet synchronization,
   each input port of each said switching device is coupled to an input port of its corresponding said input circuit via one of said receiver circuits, and
   each output port of each said switching device is coupled to an output port of a respective one of said second storage circuits.

6. A switching network according to claim 3, wherein said each switching element further comprises
   a corresponding plurality of second data packet storage circuits each having at least one input port coupled to a serial output port of its corresponding said shift register portion, the output ports of said second storage circuits constituting the output ports of said switching element.

7. A switching network according to claim 1, wherein each said data packet includes destination information designating a particular output of the switching element, and each said switching element further comprises
   a corresponding plurality of identification circuits for comparing the destination information of a data packet presently stored in the corresponding shift register portion with the identity of at least one output of said corresponding shift register portion and in resppponse to a positive such comparison, enabling the transmission of that data packet from said corresponding shift register portion to said at least one output.

8. A switching network according to claim 7, wherein said destination information of a data packet is in the form of a plurality of bits each corresponding to a particular output of the switching element and indicating whether or not its associated data packet is to be transmitted to said particular output.

* * * * *